United States Patent [19]

Narahara et al.

[11] 3,968,514

[45] July 6, 1976

[54] MAGNETIC RECORDING AND/OR REPRODUCING APPARATUS

[75] Inventors: Hisaaki Narahara, Musashino; Yoshio Ishigaki, Tokyo, both of Japan

[73] Assignee: Sony Corporation, Tokyo, Japan

[22] Filed: Dec. 30, 1974

[21] Appl. No.: 537,454

[30] Foreign Application Priority Data

Dec. 28, 1973  Japan.................................. 49-3349
Dec. 28, 1973  Japan.................................. 49-3352

[52] U.S. Cl. ..................................................... 358/4
[51] Int. Cl.² ............................................. H04N 5/79
[58] Field of Search .............................. 350/4, 11

[56] References Cited
UNITED STATES PATENTS

| 3,384,706 | 5/1968 | Davidse | 358/11 |
| 3,449,510 | 6/1969 | Steinkopf | 358/11 |
| 3,517,116 | 6/1970 | Rennick | 358/11 |
| 3,702,377 | 11/1972 | Kerr | 358/11 |

*Primary Examiner*—John C. Martin
*Attorney, Agent, or Firm*—Lewis H. Eslinger; Alvin Sinderbrand

[57] ABSTRACT

In recording PAL television signals, the chrominance signal components of field intervals are recorded in successive parallel tracks on a record medium. The ends of the margins between the line intervals of each field are recorded in each of the tracks and are aligned, in the direction transverse to the lengths of the tracks, with the adjacent ends of such margins in the next adjacent tracks. Interference, or cross-talk, between signals recorded in adjacent tracks is reduced or eliminated during reproduction by converting the alternating polarity chrominance component into one of fixed polarity, similar to an NTSC signal, and then recording the information signals with different first and second carriers in the adjacent tracks, respectively. Such first and second carriers for signals recorded in adjacent tracks may be distinguished from each other by their respective frequency and/or polarity characteristics. When the signals recorded in a particular track are reproduced, the cross-talk signals from adjacent tracks can be conveniently suppressed or eliminated, for example, with the aid of a simple comb filter, by reason of the different frequency and/or polarity characteristics of the carriers of interfering signals. The signals are then reconverted to PAL form to be played back on apparatus designed to reproduce images in response to PAL signals.

10 Claims, 16 Drawing Figures

MAGNETIC RECORDING AND/OR REPRODUCING APPARATUS

BACKGROUND OF THE INVENTION

1. Field of the Invention

This invention relates generally to the recording and reproduction of PAL television signals. More particularly, it is directed to the conversion of such signals to a form similar to NTSC signals to permit the reduction of cross-talk in the reproduction of such signals recorded in adjacent tracks, even though the relatively low frequency chrominance components of color video signals are recorded for every line interval of each track and even though the tracks are very close together or are even overlapping.

2. The Prior Art

It is well-known to record video signals on magnetic tape or other forms of recording medium by scanning successive parallel tracks on the record medium with one or more transducers energized by the video signals. There has been a constant effort to improve the efficiency of use of the recording medium by packing the tracks as close together as possible. The packing density has always been limited, by, among other things, the fact that, during reproduction of the recorded signals, a reproducing transducer scanning each of the tracks in order could pick up signals or cross-talk from adjacent tracks.

One important step in minimizing cross-talk of low frequency information is disclosed in U.S. patent application Ser. No. 277,815, filed Aug. 3, 1972 and assigned to the assignee of the present case. In some embodiments of that earlier application, the relatively high frequency luminance components were recorded during every line area increment on every track and each line increment area was recorded in side-by-side alignment with line increment areas in the next adjacent tracks on each side. This is known as H alignment and is a technique that has long been used to avoid interference due to picking up horizontal synchronizing signals from one track while picking up signals from the main part of each line interval from the next adjacent track. In accordance with another known technique, the frequency band of the chrominance carrier and components modulated thereon was converted to a relatively low frequency band. Conversion to the low frequency made the chrominance components more susceptible to cross-talk interference from adjacent recorded tracks, but such cross-talk was minimized by not recording the low frequency chrominance components in adjacent line increment areas of adjacent tracks. The chrominance components were recorded intermittently, usually during alternate line intervals, but it was also permissible to record the chrominance components in other intermittent patterns, all of which had the characteristic that chrominance components would not be recorded in side-by-side line increments of two adjacent tracks. If this recording format were visible, the chrominance components would appear to be recorded in a checkerboard-like pattern. Furthermore, the luminance components, as well as chrominance components, could also be recorded intermittently in this same way to permit even further overlapping of adjacent tracks.

In the reproduction of signals recorded with this checkerboard-like pattern, the intermittent components were utilized directly upon reproduction and were also delayed for the length of time necessary to permit them to be used again during the next succeeding interval in which similar information was not recorded. This system reduced the cross-talk interference but at some sacrifice in the quality of the reproduced image.

Another important step in minimizing cross-talk of low frequency signals was disclosed in U.S. patent application Ser. No. 492,330, filed July 26, 1974 and assigned to the assignee of the present case. That application also utilized H alignment and conversion of the frequency of chrominance signal components but recorded the relatively low frequency chrominance signal components in each line increment area of each track. Cross-talk between signals recorded in adjacent tracks was reduced by converting the chrominance sub-carrier differently during each line interval or field interval or both. One embodiment changed the sub-carrier frequency a substantial amount at the beginning of each line interval during alternate fields. Other embodiments changed the frequency only a little or reversed the polarity of the sub-carrier during selected line intervals. Upon reproduction of the signals recorded in a particular track according to any of the proposed formats, the frequency components of the cross-talk signals were frequency-interleaved with frequency components of the desired signals so that the cross-talk components would be intercepted by a comb filter in the playback circuit.

The description of the invention in application Ser. No. 492,330 was based on the recording of NTSC signals. The NTSC standards require that the two chrominance signal components be modulated on sub-carriers of the same frequency but angularly spaced by a fixed 90°. The sub-carriers are then combined into one signal. The sub-carrier frequency is an odd multiple of one-half the line repetition frequency. This makes it possible to cause the chrominance frequency components of potentially interfering line intervals to be offset by an odd multiple of one-fourth of the line repetition frequency and in opposite directions so that these frequency components of potentially interfering signals are spaced apart by an odd multiple of one-half of the line repetition frequency. Such interleaved frequency components are especially suitable for separation by means of a comb filter.

PAL signals are used in a number of countries and are different from the NTSC signals, basically, in that the phase of one of the sub-carriers reverses at the end of each horizontal line interval. Because of the periodic phase reversal of the PAL sub-carrier, the frequency of the latter is offset by only an odd multiple of one-fourth of the line repetition frequency. The line and field repetition frequencies are usually different in NTSC and PAL systems, but those are not fundamental differences.

The periodic reversal of the sub-carrier of one chrominance signal of a PAL signal causes a frequency offset of the harmonic components of one chrominance signal relative to the other. This offset interferes with separation of undesired chrominance signals, which are inadvertently picked up from the next adjacent track, from the desired chrominance signals.

It is one of the objects of this invention to achieve the advantages of periodic reversal or shift of the chrominance carrier for selected line intervals in a video recorder for PAL color television signals to minimize cross-talk.

Another object is to modify the chrominance signals of a PAL signal while converting the frequencies thereof to transform the PAL signals to a form suitable for separating undesired chrominance signals from desired ones by means of a comb filter.

Further objects will be apparent from the following description and the drawings.

SUMMARY OF THE INVENTION

In accordance with the present invention, the chrominance components of a PAL color television signal are passed through a comb filter and are frequency-converted by a signal that shifts periodically in frequency or polarity and in such a manner that the chrominance signal in each line interval, in each recorded track will be substantially free of cross-talk interference that might be picked up from signals recorded in abutting, aligned line interval areas on the next adjacent tracks. The converting frequencies and polarities are so selected as to transform the PAL signals into NTSC-type signals, that is, into signals that have a constant phase relationship between the angles of the carriers on which the chrominance signals are modulated. Playback apparatus for such recordings includes means to transform the NTSC-type signals back into PAL form and back to the relatively high frequency part of the video band.

DETAILED DESCRIPTION OF THE PREFERRED EMBODIMENTS

Figure 1:
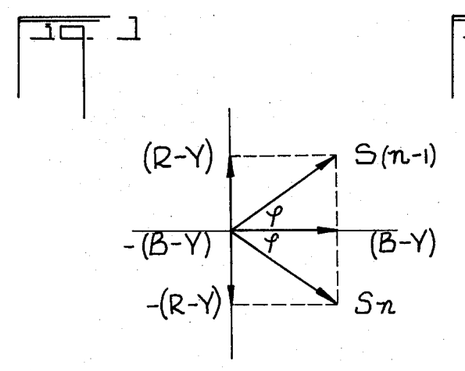
FIG. 1 is a vector diagram illustrating the relationship between chrominance signals in two successive lines of a PAL television signal.

FIG. 1 shows the vector relationship of signals in two successive line intervals of the chrominance signal component of a PAL color television signal. A PAL signal is characterized by the reversal, at line repetition rate, of polarity of the sub-carrier on which one of the chrominance signals is modulated. The acronym, PAL, is derived from phase-alternation by line. The carrier that is reversed is the one on which the red color difference signal (R-Y) is modulated. The blue color difference signal (B-Y) is modulated on a carrier having the same frequency and a constant phase. The vector sum of the (B-Y) and (R-Y) components during alternate line intervals is the signal $S_{s(n-1)}$. During the remaining alternate line intervals, when the carrier for the (R-Y) signal is inverted, the vector sum is $S_{sn}$.

Figure 2:
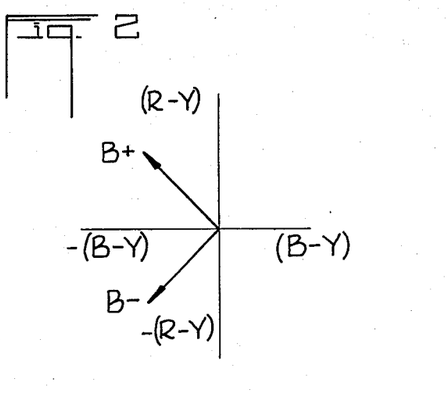
FIG. 2 is a vector diagram representing the relationship between burst signals for the two lines corresponding to the signals represented in FIG. 1.

In order to allow a PAL color television signal to be properly decoded, the burst frequency used to synchronize the local sub-carrier oscillator in the playback unit, or receiver, has two phase relationships, as illustrated in FIG. 2. During those line intervals in which the chrominance vector sum signal is $S_{s(n-1)}$, the burst signal is illustrated by the vector $B_+$, which is 135° counterclockwise from the axis of the sub-carrier on which the (B-Y) signal is modulated. During the remaining alternate line intervals the burst signal has a phase relationship illustrated by the vector $B_-$, which is 90° removed from the angle of the $B_+$ vector and is 225° counterclockwise from the axis of the (B-Y) signal.

Figure 4:
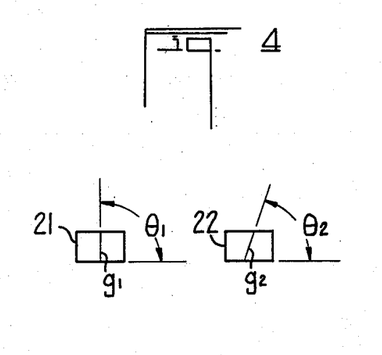
FIG. 4 shows the sections defining the air gaps of two recording and playback heads.

Face views of two transducers 21 and 22 of the type used to record and reproduce video signals are shown in FIG. 4 to clarify the difference in azimuth angles of their respective gaps $g_1$ and $g_2$. The azimuth angle of the transducer 21 is $\theta_1$ and is 90° in the example shown, while the azimuth angle $\theta_2$ of the transducer 22 is approximately 60°.

Figure 5:
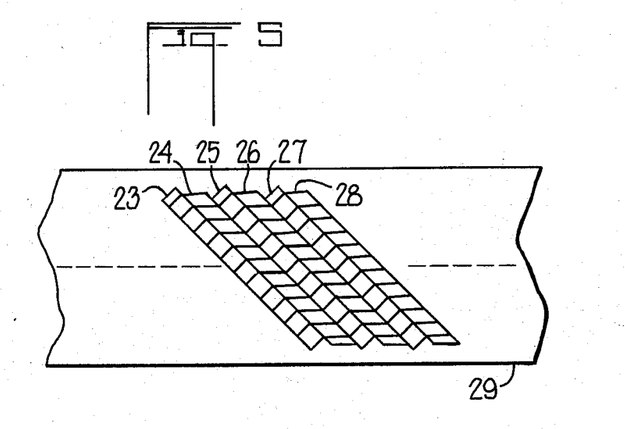
FIG. 5 shows a section of tape on which signals have been recorded by the heads of FIG. 4 for several successive field intervals.

FIG. 5 illustrates the recording of several tracks 23–28 on a piece of tape 29 in which the odd-numbered tracks are recorded by the transducer 21 of FIG. 4 and the even-numbered tracks are recorded by the transducer 22.

Generally the standards for PAL television signals are based on a horizontal repetition frequency $f_n$ of approximately 15.63KHz, a vertical scanning frequency of 50Hz, and a chrominance sub-carrier frequency $f_s$ of approximately 4.43MHz. As stated previously, the frequency $f_s$ is offset from one of the harmonics of the frequency $f_h$ by $\frac{1}{4}(f_h)$.

Figure 6:
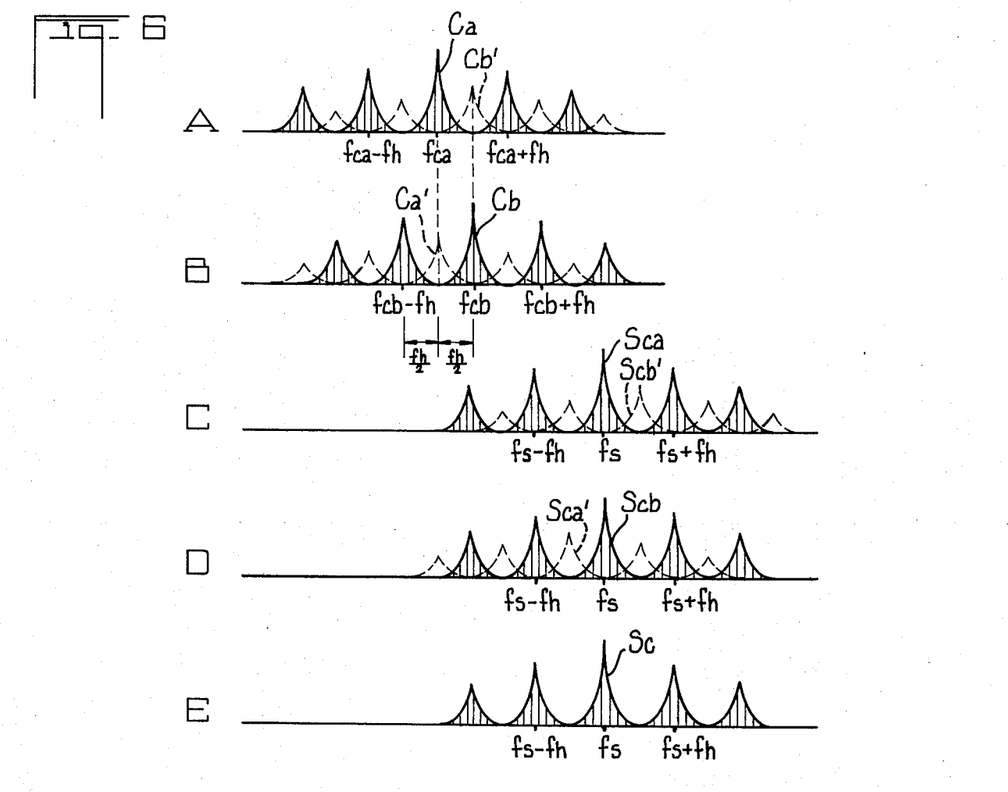
FIG. 6 is a frequency spectrum illustrating the relationship between desired and undesired chrominance signals at different points in the system according to the invention.

The elimination of undesired chrominance signal components in the circuits described in application Ser. No. 492,330, supra, depends upon the type of frequency relationships illustrated in FIG. 6. FIG. 6A shows part of the spectrum of two frequency converted NTSC chrominance signals $C_a$ and $C_b'$. The signal $C_a$ is the desired signal and is modulated on a carrier frequency $f_{ca}$ and it consists of clusters of side components adjacent $f_{ca}$ and $f_{ca} \pm n f_h$, where $n$ is an integral number. Each cluster consists of components spaced apart by the field frequency and represented by vertical lines. Much of the space between each of the clusters has substantially no information of the signal $C_a$ in it.

The signal $C_b'n$, is the interfering, or cross-talk, signal with respect to the signal $C_a$ and is based on modulation of a carrier frequency $f_{cb}$ offset from the frequency $f_{ca}$ by $\frac{1}{4}(f_h)$. The amplitude of this signal $C_b'$ is illustrated as being smaller than that of the signal $C_a$ in accordance with the expectation that the cross-talk signal would naturally have a lower amplitude than the desired signal. It will be observed that the peak amplitudes of the signal $C_b'$ fall in the regions of the signal $C_a$ that have low amplitude.

FIG. 6B illustrates the converse situation in which the desired signal is now the signal $C_b$ and the cross-talk signal is $C_a'$. The frequencies of the components of the signal $C_a'$ are the same as the signal $C_a$ and the frequencies of the components of the signal $C_b$ are the same as the components of the signal $C_b'$. However, the amplitude of the signal $C_a'$ is lower than that of the signal $C_b$ in the same way and for the same reason that the amplitude of the cross-talk signal $C_b'$ in FIG. 6A is lower than the amplitude of the desired signal $C_a$.

When the signals in FIG. 6A are frequency converted to shift the carrier frequency from $f_{ca}$ to $f_s$, the desired signal is identified as $S_{ca}$ in FIG. 6C. This signal and its side bands are identical with the desired signal $C_a$ in FIG. 6A except for the carrier frequency. Similarly, the undesired signal $S_{cb}'$ has the same amplitude as the undesired signal $C_b'$ in FIG. 6A. The frequency conversion from the carrier frequency $f_{ca}$ to the carrier frequency $f_s$ is obtained by using a converting signal that has a frequency $f_s + f_{ca}$.

FIG. 6D shows the relationship that corresponds to that of FIG. 6B, when the carrier $f_{cb}$ is converted to the frequency $f_s$. The signal used to convert the carrier having the frequency $f_{cb}$ to the frequency $f_s$ has the frequency $f_s + f_{cb}$.

It will be observed in comparing the spectrum in FIG. 6C with that in FIG. 6D that the desired signal, either $S_{ca}$ or $S_{cb}$, and its harmonic components fall at the same frequencies. The undesired signal $S_{cb}'$ and its harmonic components are offset by $f_h/2$ in one direction and the undesired signal $S_{ca}'$ and its harmonic components are offset by $f_h/2$ in the other direction. However, in either case the cross-talk signal and its harmonic components fall in frequency spectrum regions in which the desired signal has a very low amplitude. Thus, in accordance with the technique described in application Ser. No. 492,330, the cross-talk signals can be eliminated from either of the desired signals $S_{ca}$ or $S_{cb}$ by passing the combined desired and cross-talk signals through a comb filter that has the known characteristic of attenuating strongly those signals having frequencies that are integral multiples of the frequency $f_h$ (or are close to that frequency) and transmitting with little attenuation those signals having frequencies that are odd integral multiples of $f_h/2$ (or frequencies close to such odd integral multiples). Either the signal $S_{ca}$ of FIG. 6C or the signal $S_{cb}$ of FIG. 6D emerges from the comb filter substantially free of any cross-talk signal, as illustrated in FIG. 6E.

Figure 7:
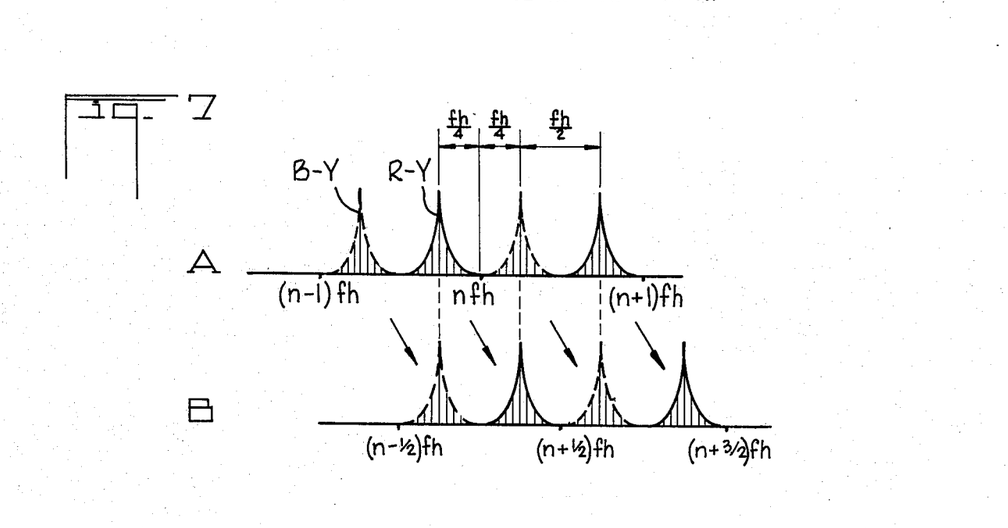
FIG. 7 shows the frequency spectrum of certain chrominance signal components in a PAL color television signal.

The PAL chrominance signal, before frequency conversion, has a spectrum of which a small fragment is shown in FIG. 7A. The two signal components, namely the (B-Y) color difference signal and the (R-Y) color difference signal are not located in common clusters, as are the two chrominance components in the NTSC-type signal illustrated in FIG. 6. Instead, the (B-Y) components are interleaved with the (R-Y) components and are spaced therefrom by $f_h/2$. The (B-Y) components are located with respect to harmonics of the basic harmonics of the basic line frequency $f_h$ at frequencies $nf_h + \frac{1}{4}(f_h)$ and the (R-Y) components are located at frequencies $nf_h - \frac{1}{4}(f_h)$. As a result, even if the chrominance signal components of a PAL signal are recorded after having been frequency converted to different carrier frequencies, the cross-talk signals cannot be eliminated by means of a comb filter because the comb filter will eliminate either the (R-Y) or the (B-Y) signal, depending upon the conversion frequencies. This is illustrated in FIG. 7B in which the chrominance components of FIG. 7A are offset by $f_h/2$ corresponding to the offset between the signals $S_{ca}$ and $S_{cb}'$ in FIG. 6C, for example.

According to the present invention the PAL color television signal is converted to an NTSC-type signal in which the phase of the chrominance sub-carrier does not shift each line interval. This allows the frequency components of the two chrominance signals (B-Y) and (R-Y) to fall in the same frequency clusters.

Figure 8:
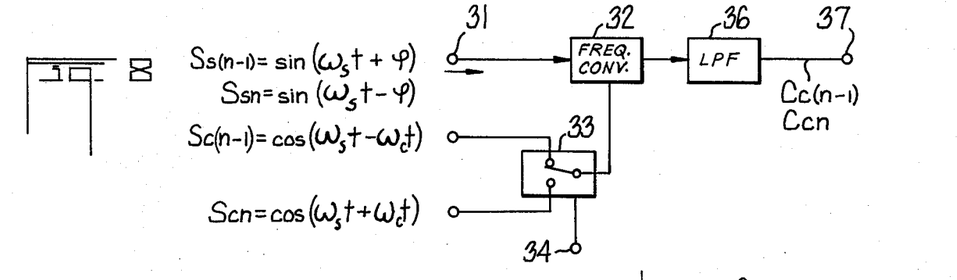
FIG. 8 is a block diagram of basic components for transforming a PAL color television signal into an NTSC-type signal.

FIG. 8 shows a basic circuit for converting the chrominance sub-carrier to a constant phase angle. In the circuit two signals $$S_{s(n-1)} = \sin(\omega_s t + \phi) \tag{1}$$

and $$S_{sn} = \sin(\omega_s t - \phi) \tag{2}$$

are illustrated as being applied to the input terminal 31. These signals are representative of chrominance signals for the line intervals $n-1$ and $n$, respectively. The phase angle $\phi$ is the phase angle illustrated in FIG. 1. The input terminal 31 is connected to a frequency converter 32 to which a converting signal is applied by means of a single-pole, double-throw switching circuit 33. The signals that are to pass through the switching circuit 33 are indicated as the signals:

$$S_{c(n-1)} = \cos(\omega_s t - \omega_c t) \tag{3}$$

$$S_{cn} = \cos(\omega_s t + \omega_c t) \tag{4}$$

The switching circuit 33 is actuated by a square wave signal having a repetition rate of $\frac{1}{2}(f_h)$ applied to a switching input terminal 34.

The relationship between the operation of the switching circuit 34 and the application of the signals to the input terminal 31 is such that when the input signal $S_{s(n-1)}$ is applied through the terminal 31 to the frequency converter 32, the signal $S_{c(n-1)}$ is applied by way of the switching circuit 33 to the frequency converter. Conversely, when the signal $S_{sn}$ is applied to the input terminal 31, the signal $S_{cn}$ passes through the switching circuit.

The frequency converter 32 operates to multiply the signal applied to the input terminal 31 by the signal received from the switching circuit 33. Thus, during the line $n-1$ the frequency converter produces an output signal $C_{c(n-1)}$ defined by the following equation:

$$\begin{aligned} C_{c(n-1)} &= S_{s(n-1)} \times S_{c(n-1)} \\ &= \sin(\omega_s t + \rho) \times \cos(\omega_s t - \omega_c t) \end{aligned}$$

-continued
$$= \frac{1}{2}[\sin(2\omega_s t - \omega_c t + \rho) + \sin(\omega_c t + \rho)] \quad ....(5)$$

Similarly, during the line n, the converter 33 produces an output signal $C_{cn}$ defined by the following equation:

$$\begin{aligned} C_{cn} &= S_{sn} \times S_{cn} \\ &= \sin(\omega_s t - \rho) \times \cos(\omega_s t + \omega_c t) \\ &= \frac{1}{2}[\sin(2\omega_s t + \omega_c t - \rho) - \sin(\omega_c t + \rho)] \end{aligned} \quad ....(6)$$

The low pass filter 36 passes only the low frequency components of the signals $C_{c(n-1)}$ and $C_{cn}$ and although these components are passed by the filter during alternate line intervals, they have the same carrier frequency and the same phase angle $\phi$. Thus, in effect, the signal $C_c$ at the output terminal 37 is $$C_{c(n-1)} = C_{cn} = C_c = \sin(\omega_c t + \phi) \quad (7)$$

Figure 9:
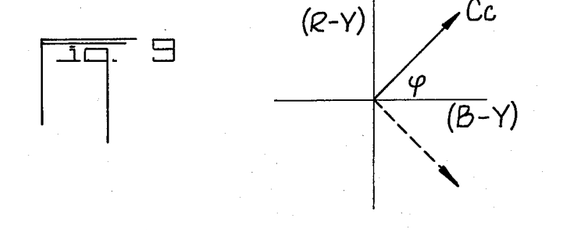
FIG. 9 is a vector diagram illustrating the output signal in the circuit of FIG. 8.

The signal $C_c$ is illustrated in FIG. 9.

Figure 10:
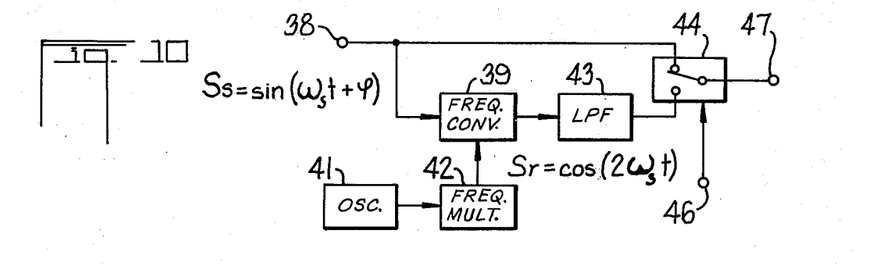
FIG. 10 is a block diagram of the basic components for transforming an NTSC-type signal back into a PAL signal.

In order to transform an NTSC-type signal $S_s$ with its constant phase relationship between the axes for the two color difference signals back into a PAL signal in which the polarity of one of the axes is periodically reversed, the signal $S_s$ is applied to the input terminal 38 of the circuit in FIG. 10. This terminal is connected to a frequency converter 39 that is supplied continuously with a signal $S_r$ defined by the equation:

$$S_r = \cos(2\omega_s t) \quad (8)$$

The signal $S_r$ is generated by multiplying the frequency of the output signal of an oscillator 41. This multiplication is performed in a frequency multiplier 42, and the resulting frequency is twice the frequency of the PAL burst signal.

When the signal $S_s$ is multiplied by the signal $S_r$ in the frequency converter 39, the result is a signal $S_c'$ given by:

$$\begin{aligned} S_c' &= S_s S_r \\ &= \sin(\omega_s t + \rho) \times \cos 2\omega_s t \\ &= \frac{1}{2}[\sin(3\omega_s t + \rho) - \sin(\omega_s t - \rho)] \end{aligned} \quad ....(9).$$

A low pass filter 43 connected to the output of the frequency converter 39 permits only the low frequency component of the signal $S_c'$ to pass through to one of the fixed terminals of a single-pole, double-throw switching circuit 44. The input terminal 38 is connected directly to the other fixed terminal of the switching circuit 44. The switching operation of this circuit is controlled by a square wave signal having the repetition frequency $\frac{1}{2}(f_h)$ applied to a switching input terminal 46. It will be noted that the phase angle $-\phi$ of the low frequency portion of the signal $S_c'$ is the negative of the phase angle $\phi$ of the signal $C_c$ applied to the input terminal 38 but that these signals are otherwise identical. The switching of the circuit 44 during alternate line intervals allows the signal $C_c$ to pass to the output terminal 47 during alternate line intervals and the signal $S_c'$ to pass to the output terminal 47 during the remaining alternate line intervals. This recreates the PAL color television chrominance signal with its alternating sub-carrier phase.

Figure 11:
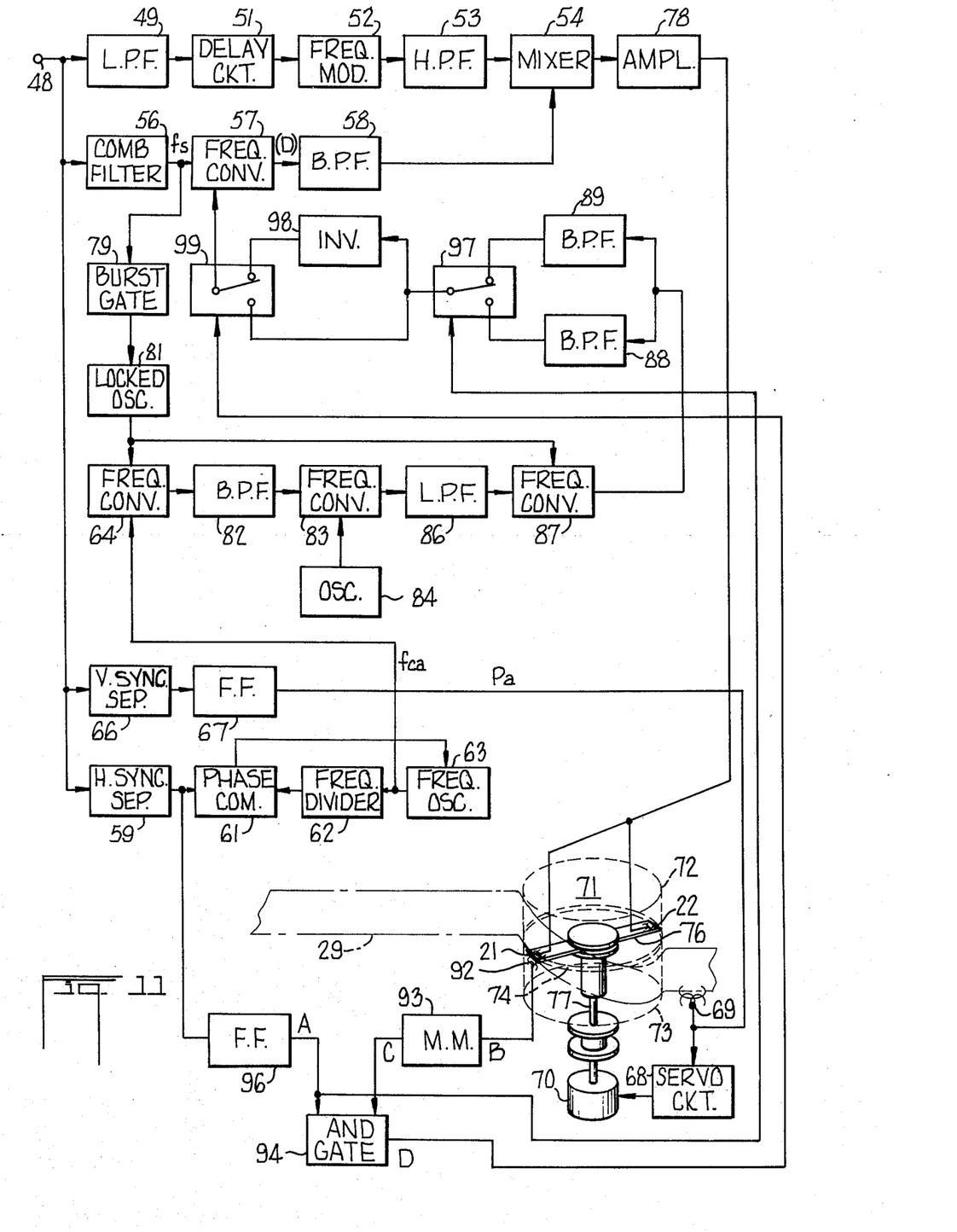
FIG. 11 is a block diagram of one embodiment of video tape recording apparatus according to the invention.

In the illustration in FIG. 11 of a video tape recording system in accordance with the present invention, a color video signal input terminal 48 is provided to receive a composite PAL video signal that includes both luminance and chrominance components and is composed of line, field, and frame intervals with blanking and synchronizing portions in each of those intervals. A low pass filter 49 connects the input terminal to a delay circuit 51 that, in turn, supplies a signal to a frequency modulator 52. The frequency modulator includes a source for generating a carrier, the frequency which is to be modulated. The output of the frequency modulator 52 is fed through a high pass filter 53 to a mixer 54.

The input terminal 48 is also connected to a comb filter 56 that separates out the chrominance signal components of the composite video signal. The output of the comb filter 56 is connected to a frequency converter 57. The frequency converted output signal is supplied from the converter 57 through a band pass filter 58 to a mixer 54.

The input terminal 48 is also connected to a horizontal synchronizing signal separator 59, the output of which is connected to a phase comparison circuit 61 that also receives signals via a frequency divider 62 from an oscillator 63. The phase comparator circuit 61 has its output connected to the oscillator 63 to control the frequency thereof, and the output of oscillator 63 is connected to a frequency converter 64.

The input terminal 48 is also connected to a vertical synchronizing signal separator circuit 66, the output of which is applied to a flip-flop circuit 67. This flip-flop circuit is connected to a servo-control circuit 68 that controls the operation of a transducer driving motor 69 in accordance with standard practice. In addition to being connected to the servo-circuit 68, the flip-flop 67 is also connected to a control signal transducer 69 located to record control signals along one edge of the magnetic tape recording medium 29 wrapped helically part of the way around a drum 71. This drum comprises an upper portion 72 and a lower portion 73 with a slot 74 therebetween. The two transducers 21 and 22 are located at opposite ends of an arm 76 affixed to the end of a shaft 77 driven by the motor 69. An amplifier 78 connects the mixer 54 to the transducers 21 and 22.

The part of the apparatus in FIG. 11 described to this point corresponds to apparatus described in application Ser. No. 492,330 to record NTSC signals. The apparatus in FIG. 11 includes additional components to transform the PAL chrominance signals into NTSC-type signals. These additional components include a burst gate 79 connected to the output of the comb filter 56. The burst gate 79 is connected to a phase-locked oscillator 81 to control the operating frequency thereof. This oscillator is connected to the frequency converter 64.

The output of the frequency converter 64 is applied through a band pass filter 82 to another frequency converter 83. An oscillator 84 is also connected to the frequency converter 83 and the output of the frequency converter is connected through a low pass filter 86 to still another frequency converter 87. The latter also receives signals from the phase-locked oscillater 81 and supplies a frequency converted output signal to two band pass filters 88 and 89. The outputs of these filters is connected to the fixed terminals of a single-pole, double-throw switching circuit 91.

A transducer 92 is located in a fixed position adjacent the path of the rotating arm 76 in the drum 71 and is connected to the trigger input terminal of a monostable multivibrator 93. The output of the multivibrator is connected to one input terminal of an AND gate 94. A flip-flop 96 connected to the output of the horizontal sync separator 59 is connected to the other input terminal of the AND gate 94 and to the switching control terminal of a switching circuit 97. This switching circuit is the equivalent of a single-pole, double-throw switch, and its two poles are connected to the output terminals of the band pass filters 88 and 89, respectively. The arm of the switching circuit 97 is connected to an inverter 98 and to one of the poles of another single-pole, double-throw switching circuit 99. The output of the inverter 98 is connected to the other pole of the switching circuit 99. The output of the AND gate 94 is connected to the switching signal input, or control, terminal of the switching circuit 99, and the output of this switching circuit is connected to the frequency converter 57.

Figure 3:
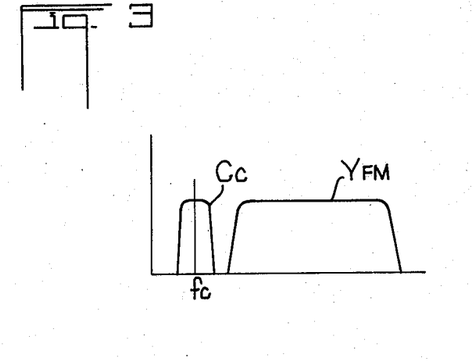
FIG. 3 is a frequency-response curve illustrating the relationship between frequency converted chrominance signals and a carrier frequency modulated by luminance signals.

In the operation of the circuit in FIG. 11 a composite PAL signal to be recorded is applied to the input terminal 48. The lower frequency portion containing the luminance signal passes through the low pass filter 49 and is subjected to a short delay in the delay circuit 51 before reaching the frequency modulator 52. The frequency modulator includes an oscillator the frequency of which is varied by the luminance signal. Thereafter the frequency modulated signal within the band $Y_{FM}$ in FIG. 3 passes through the high pass filter to the mixer 54. The chrominance components, after having been modified in a manner to be described hereinafter, are also applied to the mixer 54, and the mixed signals pass through the amplifier 78 to the transducers 21 and 22.

The tape 29 is wrapped approximately half-way around the drum 71 along a helical path and is pulled lengthwise at a certain speed. The motor 69 rotates the arm 76 on which the transducers 21 and 22 are mounted. The relative speed of movement of the tape 29 and rotation of the transducers 21 and 22, and the angle of the helix are such that the tracks 23–28 (FIG. 5) recorded by the two transducers are contiguous with each other or may even overlap somewhat.

The input PAL at the terminal 48 are also applied to the vertical sync separator 66, and the separated vertical sync pulses trigger the flip-flop 67 to generate a square wave signal having half the repetition rate of the vertical, or field, repetition rate. This square wave is recorded on the edge of the tape 29 by the transducer 69 and is applied to the servo circuit 68 to control the rotational speed of the motor 69.

The incoming PAL signals at the terminal 48 are also applied to the horizontal sync separator 59 and the relative timing of the separated horizontal sync signal is compared in the phase comparator 61 with the output pulses of the frequency divider 62. The input signal to the frequency divider is generated in the oscillator and has the freqency $f_c$. This frequency $f_c$ is maintained by the output of the phase comparator 61 and is $n$ times the horizontal repetition frequency $f_h$, where $n$ is the division ratio of the frequency divider 62.

The incoming PAl signal is also applied to the comb filter 56 that filters out integral harmonics of the frequency $f_h$. These are the harmonics that constitute the luminance signal. Therefore, the output signal of the filter 56 is the components of the chrominance signal clustered around the sub-carrier frequency $f_s$.

During the blanking portion of each horizontal line interval the only signal that passes through the filter 56 is the burst signal at the frequency $f_s$. This signal is gated by the burst gate 79 that prevents signals from passing through at any other times. The burst signal frequency of the phase-locked oscillator 81 to the frequency $f_s$, and this continuous signal is applied to the frequency converter 64 along with the signal having the frequency $f_c$ from the oscillator 63. The frequency converter produces, among other signals an output signal having a frequency $f_s + f_c$ that passes through the band pass filter 82.

The signal having the frequency $f_s + f_c$ from the filter 82 is combined in the frequency converter with the signal having the frequency $f_s - ¼(f_h)$ from the oscillator to produce signals having frequencies equal to the sum and difference of the applied signals, but only the signal having the difference frequency $f_c - ¼(f_h)$ can pass through the filter 86 to the frequency converter 87. There the relatively low frequency signal is combined with the signal having the sub-carrier frequency $f_s$ from the oscillator 81 to produce output signals having frequencies $f_s + f_c - ¼(f_h)$ and $f_s - f_c + ¼(f_h)$.

The latter signals are applied to the two band pass filters 88 and 89. The filter 88 passes the lower frequency signal having the frequency $f_s - f_c + ¼(f_h)$ and the filter 89 passes the higher frequency signal having the frequency $f_s + f_c - ¼(f_h)$.

As one way of minimizing interference from chrominance signals inadvertently picked up from adjacent recorded tracks, application Ser. No. 492,330 proposed the use of polarity reversal of the frequency converted chrominance sub-carrier during alternate line intervals of alternate tracks. During the remaining alternate line intervals of the same tracks and during the alternate tracks the polarity of the sub-carrier would remain constant. The periodic polarity reversal of the sub-carrier at one-half the line repetition frequency $f_h$ resulted in replacing the sub-carrier frequency $f_a$ by two frequencies $f_a + ½(f_h)$ and $f_a - ½(f_h)$, which were inherently in interleaving relationship with the constant frequency $f_a$ of the sub-carrier in the adjacent tracks.

Figure 12:
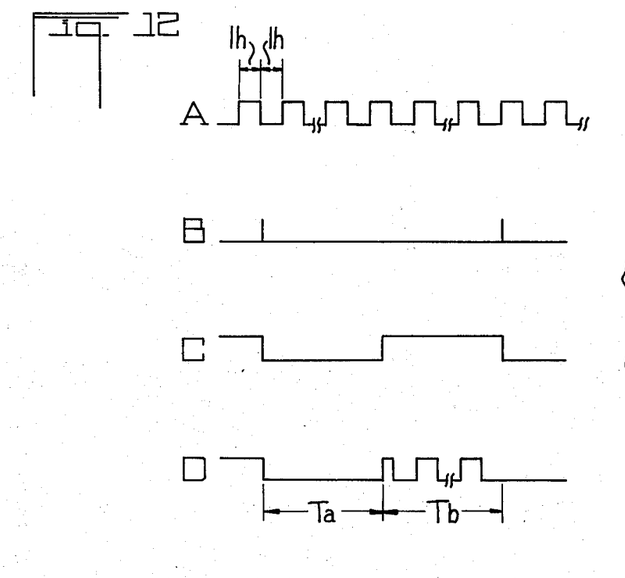
FIG. 12 shows waveform diagrams at various points in the circuit in FIG. 11.

A similar pattern of recording is produced in the present case by applying the square wave output signal A, as shown in FIG. 12, of the flip-flop 96 to the switching circuit 97 to allow the signals having frequencies $f_s - f_c + ¼(f_h)$ and $f_s + f_c - ¼(f_h)$ to be supplied during alternate line intervals to the inverter 98 and to the switching circuit 99. The fixed transducer 92 picks up a signal B shown in FIG. 12 from rotation of the arm 76. The signal B is applied to a suitable pulse generator, such as the monostable multivibrator 93 to produce a square wave signal C shown in FIG. 12 having a repetition frequency equal to the rotational speed of the arm. The negative part of the signal C corresponds to the time the transducer 21 is tracing out the tracks 23, 25, and 27 in FIG. 5 while the positive part of the signal C corresponds to the time the other transducer 22 is tracing out the tracks 24, 26, and 28. When both of the square waves A and C of FIG. 12 are applied to the AND circuit 94, the output is the wave D. This corresponds to the fact that the output of the AND gate can go high only when both of its inputs go high.

The wave D applied to the switching input terminal of the switching circuit 99 allows the signal having frequency $f_s + f_c - ¼(f_h)$ to pass through to the frequency converter 57 during alternate line intervals for the time $T_a$ and the signal having the frequency $f_s - f_c + ¼(f_h)$ to pass through to the converter 57 during the remaining line intervals of the time $T_a$. The same alternation of signals takes place during the time $T_b$ except that the polarity of one of the signals is also inverted because it is required by the alternation of the switching circuit 99 to pass through the inverter 98.

The switching circuit 99 corresponds to the switching circuit 33 in FIG. 8, and the output signals at the arm of the switching circuit 99 are the signals $S_{c(n-1)}$ and $S_{cn}$ defined in connection with FIG. 8. During the line intervals when the polarity of the sub-carrier is inverted, one of the signals is inverted.

The frequency converter 57 corresponds to the frequency converter 32 in FIG. 8, and the PAL chrominance signal applied thereto from the filter 56 corresponds to the alternate line signals $S_{s(n-1)}$ and $S_{sn}$ defined in connection with FIG. 8.

In the equations defining these signals, $\omega_s$ corresponds to the sub-carrier frequency $f_s$ of the original PAL signal and $\omega_c$ corresponds to the frequency converted sub-carrier frequency $f_c - \frac{1}{4}(f_h)$. According to equation (7) the angle of the low frequency component of the output signal of the frequency converter 57 does not shift at the end of each line interval, and so the PAL chrominance signal is converted into an NTSC-type signal $C_c$. This signal passes through the band pass filter 58, which corresponds to the filter 36 in FIG. 8, to the mixer 54 to be combined with the frequency modulated signal $Y_{FM}$ in the frequency relationship illustrated in FIG. 3. The combined signal from the mixer 54 is amplified by the amplifier 78 and recorded on the tape 29 by the transducers 21 and 22.

Figure 13:
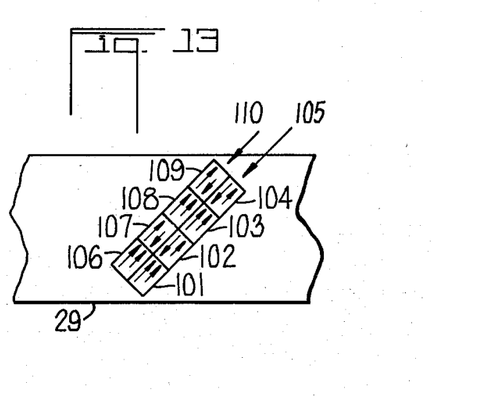
FIG. 13 shows the recording pattern produced by the apparatus in FIG. 11.

Because of the operation of the switching circuit 99 in response to the signal D in FIG. 12, the polarity of the carrier of the signal $C_c$ is reversed during alternate line intervals of alternate tracks on the tape 29. Four line interval areas 101–104 in one track 105 and four line interval areas 106–109 aligned side-by-side in H alignment with the areas 101–104 but forming part of the next track 110 are shown in FIG. 13. The large arrow in each area designates the polarity of the carrier in the signal $C_c$ recorded in that area, and the small arrow in each area represents the polarity of the carrier of the cross-talk signal $C_c{'}$ inadvertently picked up from the aligned area in the adjacent track. In the track 105, the polarity of the sub-carrier is reversed in the line interval areas 102 and 104 but not in the areas 101 and 103 and not in any areas of the track 110. The advantages of this pattern of recording line interval signals with sub-carriers of one polarity or the other will be discussed further in connection with FIG. 14.

Figure 14:
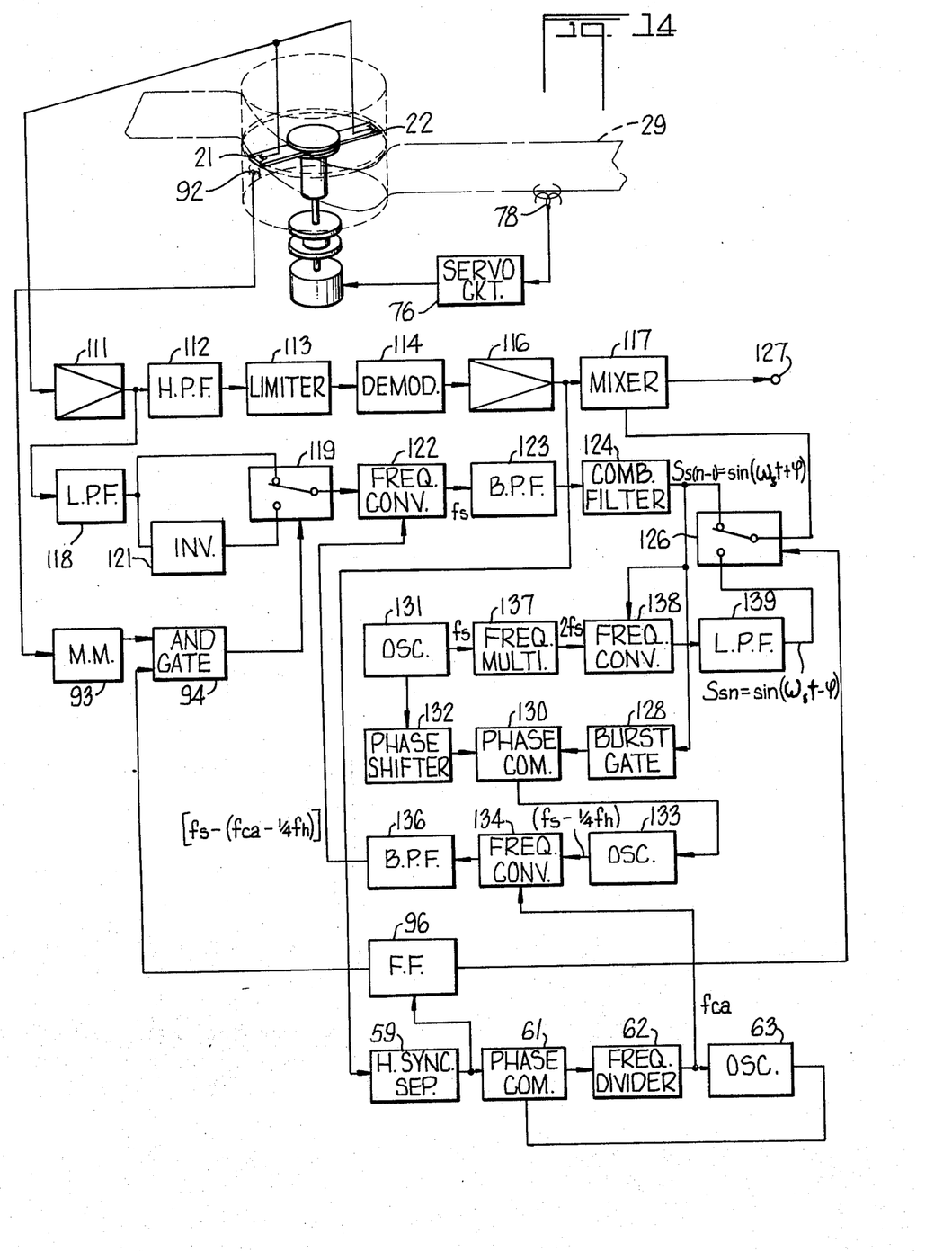
FIG. 14 is a block diagram of playback apparatus for reproducing a PAL color television signal recorded by means of the apparatus in FIG. 11.

FIG. 14 is a block diagram of the components necessary to playback the tape 29 with a series of tracks recorded on it by the apparatus in FIG. 11. The mechanical components of the playback apparatus and some of the electrical components are identical with those in FIG. 11 and will be given similar reference numerals. Among these elements are the transducers 21 and 22, which are operated as playback transducers in FIG. 14 and are connected to the input of an amplifier 111. The output circuit of this amplifier is connected through a high pass filter 112 to a limiter 113 that supplies an amplitude-limited signal to a frequency demodulator 114. The demodulator is connected to another amplifier 116 that supplies a signal to a mixing circuit 117.

The amplifier 111 is also connected through a low pass filter 118 to one terminal of a single-pole, double-throw switching circuit 119 and, through an inverter 121, to the other pole of the switching circuit. The arm of the switching circuit 119 is connected to a frequency converter 122, which in turn, is connected through a bandpass filter 123 and a comb filter 124 to one pole of a single-pole, double-throw switching circuit 126. The arm of the latter is connected to the mixing circuit 117. The output of the mixing circuit 117 is connected to a reproduced composite video signal output terminal 127 of the playback or reproducing apparatus.

The amplifier 116 is also connected to a horizontal sync separator circuit 59 that may be the same as the correspondingly numbered circuit in FIG. 11. As in FIG. 11, the horizontal sync separator circuit 59 is connected to a phase comparison circuit 61 that receives a signal from the frequency divider 62. The signal to be applied to the frequency divider 62 is generated in the oscillator 63, which is, in turn, controlled by the phase comparator 61.

As in FIG. 11, the fixed transducer 92 is connected to the monostable multivibrator 93 to trigger it to produce the square wave C in FIG. 12. The flip-flop 96 triggered by the horizontal sync separator 59 generates the square wave A in FIG. 12, and the square waves from the monostable multivibrator 93 and from the flip-flop 96 control the AND gate 94 to produce the signal D in FIG. 12. This signal controls the switching circuit 119. The square wave signal A from the flip-flop 96 is also connected to control the switching operation of the circuit 126.

The output of the comb filter 124 is connected to a burst gate 128 that is connected to a phase comparator 129. An oscillator 131 that generates a signal having the frequency $f_s$ is connected through a phase shifter 132 to the phase comparator 129. The output of the phase comparator is connected to another oscillator 133 to maintain the oscillations generated by it at a frequency $f_s - \frac{1}{4}(f_h)$. The output of this oscillator and the output of the oscillator 63 are combined in a frequency converter 134, and the output of the latter is connected through a band pass filter 136 to the frequency converter 122.

The output of the oscillator 131 is also connected to a frequency multiplier 137 that is connected to a frequency converter 138. The output of the comb filter 124 is also connected to this frequency converter, the output of which is connected through a low pass filter 139 to the second pole of the switching circuit 126.

The signals reproduced by the transducers 21 and 22 in the operation of the circuit in FIG. 14 are separated by the filters 112 and 118 into the frequency modulated signal $Y_{FM}$ and the frequency converted chrominance signal $C_c$. The signal $Y_{FM}$ is demodulated in the circuit 114, and horizontal sync pulses are separated out by the separator 59 and applied to trigger the flip-flop 96. Simultaneously, pulses from the transducer 92 actuate the monostable multivibrator 93, and the combined pulse signal D of FIG. 12 from the AND gate 94 causes the arm of the switching circuit 119 to connect inverted and non-inverted NTSC-type chrominance signals $C_c$, alternately, to the frequency converter 122.

The oscillator 133 produces a signal having a frequency $f_s - \frac{1}{4}(f_h)$ which is combined in the frequency converter 134 with the signal having the frequency $f_c$ from the oscillator 63 to produce an output signal that includes both sum and difference components. The filter 136 passes only the signal having the difference frequency $f_s - [f_c - \frac{1}{4}(f_h)]$ to the frequency converter 122 to convert the carrier frequency of the NTSC-type chrominance signal back to $f_s$.

This signal, after being filtered by the filter 123 is applied to the comb filter. Comb filters of the type used herein include a delay circuit that delays all signals for a period of time equal to a line interval. The incoming signals are subtracted from the delayed signals to produce an output signal. Thus, each signal reproduced from a line interval, such as the area 101 in FIG. 13, is combined with the signal from the next area 103. Later, the signal from the area 106 is combined with the signal from the area 107. The operation of the switching circuit 119 causes one of the combined signals to be inverted during the playback of alternate tracks to cause the main, or desired, NTSC-type chrominance signals to be combined in the proper polarity to add. At the same time, the undesired cross-talk signals are combined to cancel each other, but the signals thus combined already have the proper phase to cause cancellation of the cross-talk signals and addition of the desired signals. Thus, cross-talk signals are eliminated from each line interval because of the polarity relationship between successive line intervals.

In addition, the periodic reversal of polarity at line repetition rate is the equivalent of balanced modulation of the converted carrier by a signal having the frequency $½(f_h)$. Fourier analysis shows that this replaces the periodically reversed carrier frequency with a composite signal having two frequencies differing from the nominal carrier frequency by $± ½(f_h)$. As a result, these signals are separated to the proper frequencies to interleave the desired and cross-talk signals and this permits the comb filter 124 to separate the desired signals from the cross-talk signals on the basis of frequency difference as well as on the basis of polarity.

The oscillator 131 having a signal frequency of $f_s$ corresponds to the oscillator 41 in FIG. 10. This frequency is doubled in the multiplier 137 and applied to the frequency converter that corresponds to the frequency converter 39 in FIG. 10. The other signal applied to the frequency converter 138 is the NTSC-type signal restored to the original chrominance signal band with the carrier frequency at $f_s$ and with cross-talk signals reduced in intensity. The frequency converter reverses the phase angle $\phi$ so that the signals applied to the poles of the switching circuit 126 differ only in the polarity of the angle $\phi$. The switching circuit transmits these signals alternately as a re-created PAL signal available at the output terminal 127 after they are mixed with the demodulated luminance signal.

Figure 15:
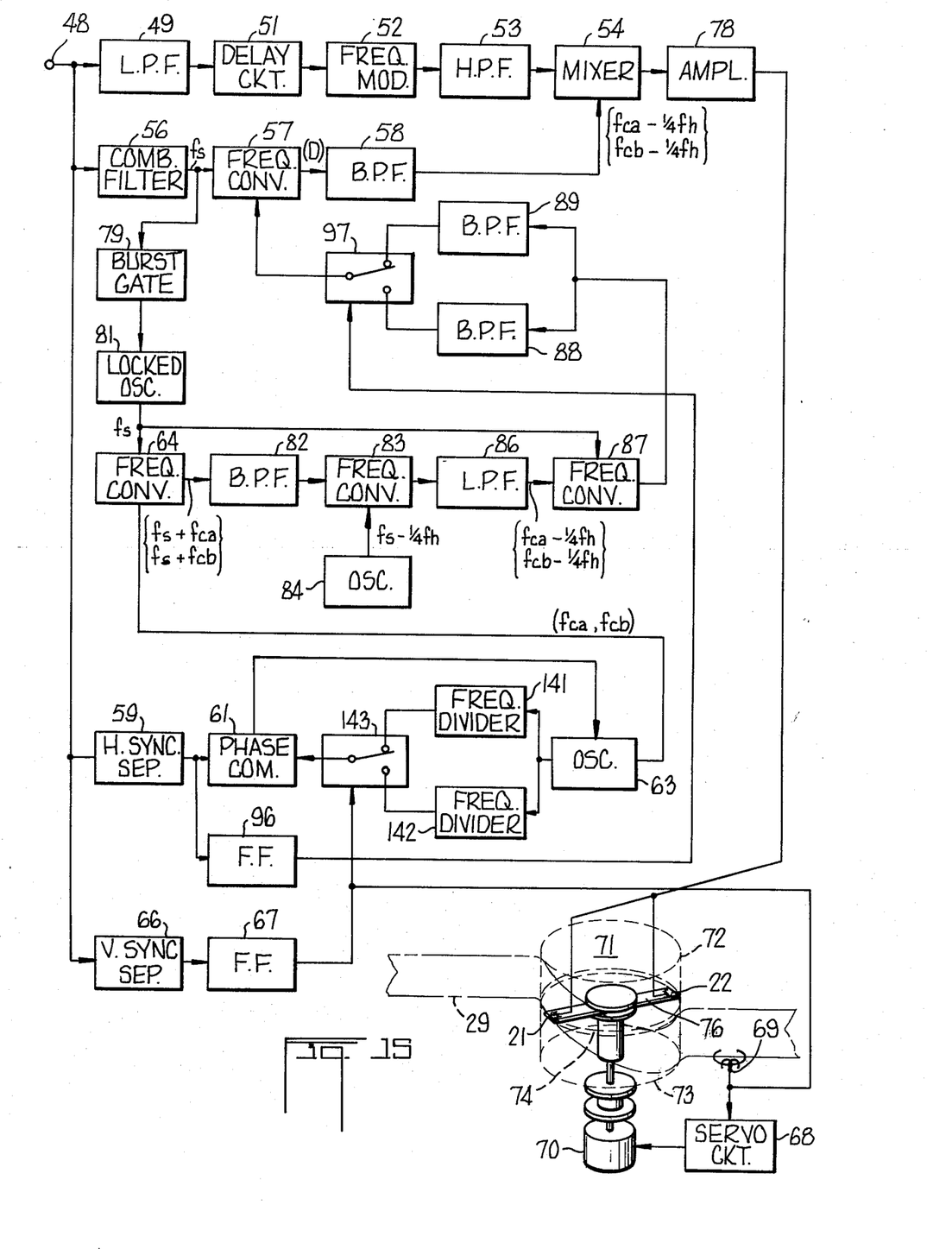
FIG. 15 is a block diagram of another embodiment of PAL color television video tape recording apparatus according to the invention.

FIG. 15 shows apparatus for transforming the chrominance signal of a PAL signal to an NTSC-type signal and then recording that signal on magnetic tape. Some of the components of the apparatus are the same as in FIG. 11 and will be identified with similar reference numerals.

The only components in FIG. 15 that are not similar, at least basically, to components in FIG. 11 are two frequency dividers 141 and 142, both of which are connected to the oscillator 63. The outputs of the frequency dividers 141 and 142 are connected, respectively, to the poles of a single-pole, double-throw switching circuit 143. The switching input terminal of the switching circuit is connected to the output of the flip-flop 71 and the output of the switching circuit is connected to the phase comparator 61.

The operation of the circuit in FIG. 15 differs from that in FIG. 11 in that, in the circuit of FIG. 15, the desired signal is separated from the cross-talk signal primarily on the basis of frequency difference rather than polarity difference. For this purpose, the oscillator 63 is capable of oscillating at either of two frequencies under the control of the direct voltage signal produced by the phase comparator 61. The two frequencies, in order to have the proper interleaving relationship, differ by an odd-multiple of ½ the line repetition frequency $f_h$. For example, the two frequencies, which may be identified as $f_{ca}$ and $f_{cb}$ may be, respectively, $87/2(f_h)$ and $88/2(f_h)$ so that they differ by $½(f_h)$.

During alternate field intervals the switching circuit 143 connects the output of the frequency divider 141, which has a division ratio of 2/87, to the phase comparator 61, and during the remaining alternate field intervals the switching circuit connects the output of the frequency divider 142, which has a division ratio 2/88, to the phase comparator 61. In either case, the phase comparator compares the output of the respective frequency divider with the horizontal sync signal at the frequency $f_h$ and produces the necessary direct voltage signal to cause the oscillator 63 to maintain the correct frequency so that, when divided, it will produce the proper frequency at the arm of the switching circuit 133.

These signals $f_{ca}$ and $f_{cb}$ are supplied alternately by the oscillator 63 to the frequency converter 64 where they are combined with the burst signal having the frequency $f_s$ to form sum and difference frequencies. The band pass filter 82 permits only the sum frequencies $f_s + f_{ca}$ and $f_s + f_{cb}$ to pass through to the frequency converter 83. There the converted signals are again converted by the output signal of the oscillator 84, which has a frequency $f_s - ¼(f_h)$. When the resulting sum and difference frequencies from the frequency converter 83 are filtered by the low pass filter 86, the output signals during alternate lines are $f_{ca} - ¼(f_h)$ and $f_{cb} - ¼(f_h)$. The latter signals are again converted in the frequency converter 87 by combination with the signal from the oscillator 81 at the frequency $f_s$. As a result, the output signal of the frequency converter 87, which includes both sum and difference frequencies, is applied to the band pass filters 88 and 89 to be separated thereby. The filter 88 transmits the difference frequencies, which are $f_s - [f_{ca} - ¼(f_h)]$ and $f_s - [f_{cb} - ¼(f_h)]$, and the filter 89 transmits the sum frequencies $f_s + [f_{ca} - ¼(f_h)]$ and $f_s + [f_{cb} - ¼(f_h)]$.

The switching circuit 97 connects the filters 88 and 89 to the frequency converter 57 during alternate line intervals, and so, during one field, the signals $f_s - [f_{ca} - ¼(f_h)]$ and $f_s + [f_{ca} - ¼(f_h)]$ pass through the switching circuit 97 alternately, and during the next field signals $f_s - [f_{cb} - ¼(f_h)]$ and $f_a + [f_{cb} - ¼(f_h)]$ pass through the switching circuit alternately. Thus, during alternate line intervals, a signal having a difference frequency that includes either $f_{ca}$ or $f_{cb}$ is applied to the frequency converter 57 and during the remaining alternate line intervals a signal having a sum frequency that includes either $f_{ca}$ or $f_{cb}$ is applied to the frequency converter. This conforms with the relationships in equations (5) and (6) for transforming a PAL chrominance signal into an NTSC-type signal.

In addition to transforming the PAL chrominance signal to NTSC-type signals, the frequency converter 57 converts the carrier frequency to $f_{ca} - ¼(f_h)$ during alternate fields and to $f_{cb} - ¼(f_h)$ during the remaining alternate fields. The difference between the frequencies $f_{ca}$ and $f_{cb}$ is an odd-integral multiple of $½(f_h)$, so that the frequency converted carriers and the components modulated thereon for successive field intervals, which are recorded on adjacent tracks, are in interleaving relationship, similar to the signals $C_a$ and $C_b$ in FIGS. 6A and 6B.

Figure 16:
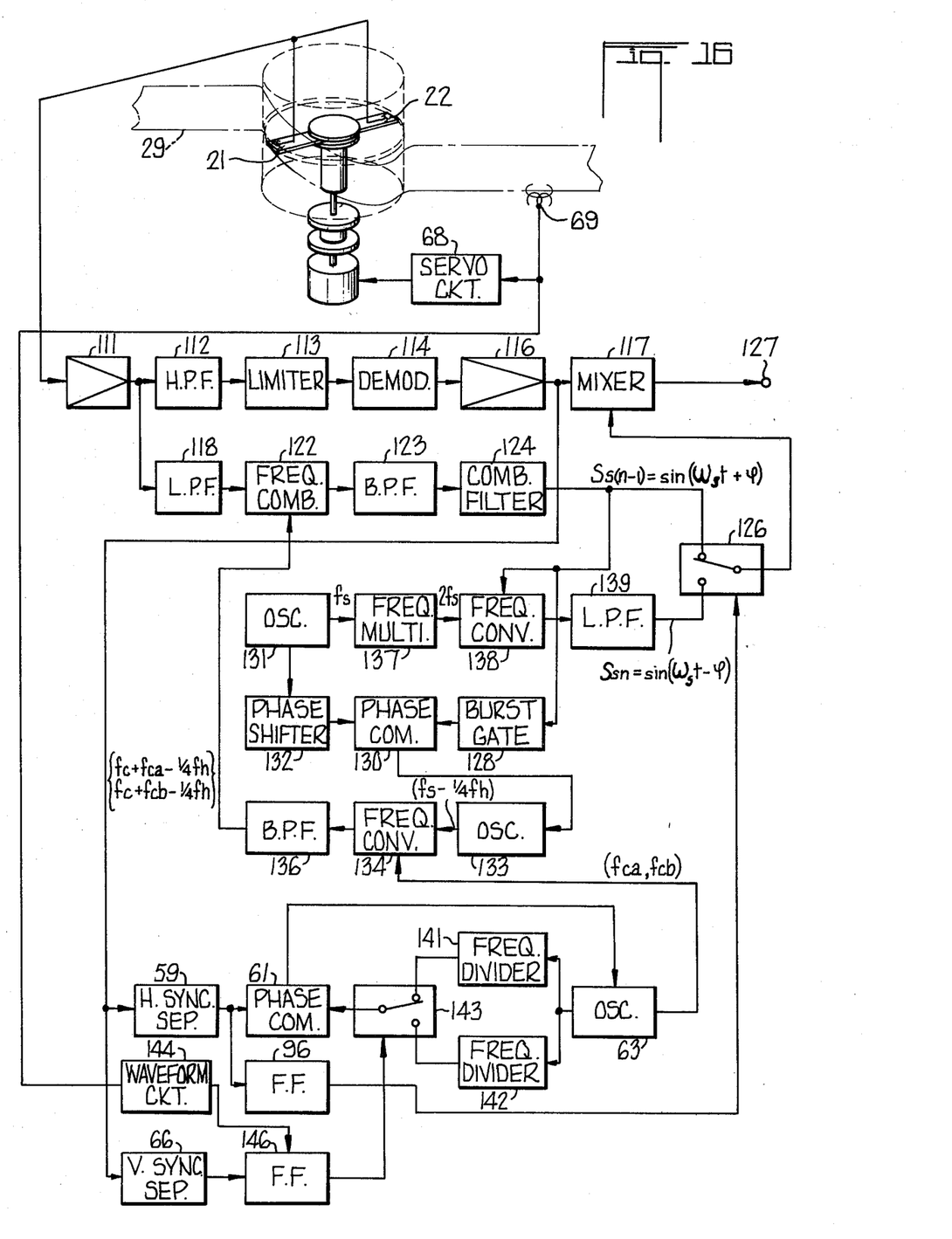
FIG. 16 is a block diagram of playback apparatus for reproducing a PAL color television signal recorded by means of the apparatus in FIG. 14.

FIG. 16 is a block diagram of apparatus for reproducing television signals from the recordings made by the apparatus in FIG. 15. Most of the circuit components in FIG. 16 correspond to those previously discussed in FIG. 14 or FIG. 15 and are identified by the same reference numerals as in those drawings. Those elemens will not be discussed again except to describe functional differences between FIG. 16 and the other figures.

The only circuit components in FIG. 16 not found in either FIG. 14 or FIG. 15 are a waveform circuit 144 that has its input circuit connected to the transducer 69 to receive signals therefrom and a flip-flop 146 connected to the vertical sync separator 66 to be actuated thereby and having a reset terminal connected to the waveform circuit 144.

In operation the flip-flop 146 actuates the switching circuit 143 to supply the frequency divided signal from the divider 141 to the phase comparator 61 during alternate fields and to supply the frequency divided signal from the divider 142 during the remaining alternate fields. The waveform circuit 144, which is basically a half wave rectifier, receives a pulse from the transducer at the beginning of each field interval. These pulses are alternately positive and negative, but only the pulses of one polarity can pass through the circuit 144. These pulses, which occur at the beginning of each alternate field, reset the flip-flop 146 if it needs resetting to cause it to produce its own square wave in the proper time relationship to cause the switching circuit to connect the frequency divider 142 to the phase comparator 61 at the time the transducer 21 or 22 is scanning a track recorded when the frequency divider 141 was being used in the recording apparatus of FIG. 15. Once the proper relationship is established, the reproduction of video signals recorded on the tape 29 can proceed correctly until it is turned off.

The signals having frequencies $f_{ca}$ and $f_{cb}$ produced during a Hernate fields by the oscillator 63 and converted to frequencies $f_s + [f_{ca} - \frac{1}{4}(f_h)]$ and $f_s + [f_{cb} - \frac{1}{4}(f_h)]$ by the converter 134 are applied to the frequency converter during the proper field intervals to re-convert the frequency of the chrominance signal to the original PAL band. The re-converted carrier frequency of the desired signal is $f_s$ and that of a cross-talk signal from the next adjacent track differs from $f_s$ by an odd multiple of $\frac{1}{2}(f_h)$ so as to interleave therewith. Such interleaving cross-talk signal can be attenuated by the comb filter 124, leaving only the desired signal to be reconverted to PAL formation by the frequency converter 138 and the switching circuit 126. The frequency of the signal from the frequency converter is always of the proper frequency (assuming correct timing of the flip-flop 146) to cause the carrier frequency of the desired re-converted to be $f_s$.

It will be obvious to those skilled in the art that this invention is not limited to the specific circuits and frequencies used as illustrations but that modifications may be made therein within the scope of the following claims.

What is claimed is:

1. In a recording system for recording PAL color television signals in a plurality of parallel tracks on a recording medium, the PAL signals being divided into line and field intervals and including a chrominance portion modulated on a PAL signal sub-carrier the phase of which is reversed for each line interval, and each of said tracks being divided into line interval areas, apparatus comprising:

A. a frequency converter, the chrominance signal portion of the PAL signal being applied to the frequency converter;

B. means to generate a first frequency converting sub-carrier at a first frequency equal to the sum of the sub-carrier frequency of the PAL color television signal plus a conversion sub-carrier frequency and a second frequency converting sub-carrier at a second frequency equal to the difference between the PAL color television sub-carrier frequency and a conversion sub-carrier frequency, the first and second frequencies differing from each other by an odd integral multiple of one-half the line repetition frequency of the PAL color television signal; and C. connecting means for applying the first and second frequency converting sub-carriers alternately, each for a line interval at a time, to the frequency converter to convert the PAL color television chrominance signal to an NTSC-type chrominance signal in a frequency band including the respective frequency converted chrominance sub-carrier frequency, said connecting means connecting the first and second frequency converting sub-carriers in one order during the recording of alternate ones of the tracks and in a different order during the remaining alternate tracks.

2. The recording system of claim 1 in which said means to generate said frequency converting sub-carriers comprises:

A. means to generate a continuous signal at the PAL color television sub-carrier frequency;

B. means to generate a signal at the conversion sub-carrier frequency; and

C. a second frequency converter to combine said continuous signal and said signal at said conversion sub-carrier frequency to produce sum and difference signals therefrom.

3. The apparatus of claim 2 in which said connecting means comprises means to invert one of said frequency converting sub-carriers during selected line intervals.

4. The apparatus of claim 3 in which said means to invert comprises means to invert during alternate line intervals recorded during alternate tracks.

5. The apparatus of claim 2 in which said means to generate a signal at the conversion sub-carrier frequency comprises:

A. means to generate a third signal having a frequency equal to an integral multiple of the line repetition frequency of the PAL signal;

B. a third frequency converter connected to combine said third signal and said continuous signal to produce a sum signal therefrom;

C. means to generate a fourth signal having a frequency different from that of said continuous signal by an odd integral multiple of one-fourth of the line repetition frequency of the PAL signal; and D. a fourth frequency converter to combine said fourth signal and said last-named sum signal to produce said signal at the conversion sub-carrier frequency.

6. The apparatus of claim 2 in which said means to generate a signal at the conversion sub-carrier frequency comprises:

A. a frequency controlled oscillator;

B. first and second frequency dividers connected thereto to divide the frequency of said oscillator in integral multiples of one-half the line repetition frequency of the PAL television system to produce first and second frequency divided signals having a frequency difference equal to an odd integral multiple of one-half the line repetition frequency of the PAL television signal;

C. a phase comparator; and

D. means to connect said frequency dividers alternately to said phase comparator to compare the frequency divided signals during alternate intervals of time with the horizontal repetition frequency of the PAL television signal, said phase comparator being connected to said oscillator to control the frequency thereof.

7. The apparatus of claim 1 comprising, in addition:

A. means to reproduce the recorded signals from each of said tracks;

B. a frequency re-converter connected to said means to reproduce, said frequency re-converter re-converting the frequency band of NTSC-type signals to the original band of chrominance signals of the PAL color television signal;

C. a comb filter connected to said frequency re-converter to transmit the desired re-converted signal and attenuate cross-talk signals having frequencies spaced for harmonic component frequencies of the re-converted signal by odd integral multiples of one-half the line repetition frequency of the PAL television signal; and D. means connected to the output of said filter to re-convert the NTSC-type signals to PAL color television chrominance componant signals.

8. In a playback system for reproducing color television signals recorded in a plurality of parallel tracks on a recording medium, the signals including a frequency converted NTSC-type chrominance portion modulated on a frequency converted subcarrier and being divided into line and field intervals, and each of said tracks being divided into line interval areas, apparatus comprising:

A. means to reproduce said recorded signals;

B. a frequency re-converter;

C. means to apply said reproduced signals to said frequency re-converter in predetermined polarity relationship;

D. means to generate a frequency re-converting carrier signal having a frequency that combines, in predetermined mathematical relationship, the PAL color television sub-carrier frequency converted sub-carrier frequency of the reproduced signal;

E. means to connect the frequency re-converting signal to said frequency re-converter to convert the carrier frequency of the reproduced chrominance portion to the PAL sub-carrier frequency;

F. a comb filter connected to said frequency re-converter to transmit desired chrominance signal harmonic frequency components and to attenuate cross-talk harmonic frequency components; and G. means connected to said comb filter to reconvert the output signal thereof to a PAL chrominance signal.

9. The apparatus of claim 8 in which said means to apply the reproduced signals to the frequency re-converter comprises:

A. an inverter; and

B. a single-pole, double-throw switching circuit connected, the output of said inverter being connected to one pole of said switching circuit and said frequency re-converter, and the other pole of said switching circuit being connected to the input of said inverter, said other pole and the arm of said switching circuit being connected in series between said means to reproduce the signals and the input of said frequency re-converter.

10. The apparatus of claim 8 in which said means to reconvert the output signal of said comb filter comprises:

A. a source of a signal at twice the frequency of the PAL sub-carrier signal;

B. an additional frequency converter connected to said comb filter and to said last-named source;

C. a single-pole, double-throw switching circuit having one pole connected to the output of said comb filter and the other pole connected to said last-named source; and D. means to switch the arm of said last-named switching circuit from one of its poles to the other at the line repetition frequency of the PAL television signal to re-create at said arm the PAL television signal.

* * * * *